United States Patent
Cleland et al.

Patent Number: 5,564,602
Date of Patent: Oct. 15, 1996

[54] BEER-DISPENSING SYSTEM AND APPARATUS

[76] Inventors: James Cleland, 420 Via Norte St., Cypress, Calif. 90630; Melvin Kyees, 16732 Intrepid La., Huntington Beach, Calif. 92649

[21] Appl. No.: 394,910

[22] Filed: Feb. 27, 1995

[51] Int. Cl.⁶ .................................................... B67D 5/62
[52] U.S. Cl. .......................... 222/146.6; 222/399; 62/393; 62/396
[58] Field of Search ............................. 222/146.6, 399; 62/393, 396

[56] References Cited

U.S. PATENT DOCUMENTS

| | | | |
|---|---|---|---|
| 2,771,752 | 11/1956 | Tennant | 62/393 X |
| 4,094,445 | 6/1978 | Bevan | 222/146.6 X |
| 4,674,296 | 6/1987 | Renaud | 62/393 X |
| 4,676,400 | 6/1987 | Lamont et al. | 222/146.6 X |
| 4,679,408 | 7/1987 | Nelson | 222/146.6 X |
| 4,730,463 | 3/1988 | Stanfill | 222/146.6 X |
| 5,279,446 | 1/1994 | Cook et al. | 222/146.6 X |

FOREIGN PATENT DOCUMENTS

| | | | |
|---|---|---|---|
| 141185 | 8/1949 | Australia | 222/146.6 |
| 652116 | 8/1994 | Australia | 222/146.6 |
| 2684088 | 5/1993 | France | 222/146.6 |
| 4031777 | 5/1991 | Germany | 222/146.6 |
| 2146620 | 4/1985 | United Kingdom | 222/146.6 |

*Primary Examiner*—Andres Kashnikow
*Assistant Examiner*—Kenneth Bomberg
*Attorney, Agent, or Firm*—Georges A. Maxwell

[57] ABSTRACT

A beer-dispensing apparatus including a source of cooled pressurized gas-ladened beer, an elongate beer delivery line extending from the source of beer to a remote beer-dispensing station, a normally closed beer-dispensing valve at the beer-dispensing station, a liquid glycol chilling and recirculating unit, a heat exchanger beer delivery structure including an elongate beer-conducting balance line smaller in inside diameter than the beer delivery line and connected with and extending between the beer delivery line and the valve, an elongate glycol-conducting tube extending longitudinally of and in heat transfer relationship with the balance tube and connected with the glycol chilling and recirculating unit to cause chilled glycol to continuously circulate through it; a thermally insulated heat-storing aluminum body about the balance and glycol tubes; glycol flowing through the glycol tube progressively lowers the temperature of beer flowing downstream through the balance tube to the valve.

18 Claims, 5 Drawing Sheets

Fig. 1.

BEER-DISPENSING SYSTEM AND APPARATUS

BACKGROUND OF THE INVENTION

This invention has to do with an improved beer-dispensing system and apparatus and is particularly concerned with an apparatus for dispensing beer from kegs at low temperature and with a minimum of foam.

Beer, as herein used, refers to anyone of those carbonated alcoholic malt beverages that are commonly called beer, ale and stout.

In most commercial establishments where beer is served, the beer is supplied in barrels or kegs. The kegs of beer are stored and let to cool in refrigerated cold rooms that are provided in most commercial establishments to store foodstuffs and beverages for immediate access and use. For practical reasons, the temperature in cold rooms must be well above freezing (32° F.) and is typically sought to be maintained between 40° F. and 45° F. Accordingly, the beer, in kegs, stored in cold rooms is cooled to between 40° F. and 45° F. Under most favorable conditions, the beer is cooled to 40° F.

The beer that is chilled to 40° F. is dispensed from normally closed selectively operable beer-dispensing valves that are located at serving stations that are remote from the cold rooms. The dispensing valves are normally carried at the upper ends of elongate vertically extending dispensing towers that are mounted atop and project upwardly from bar tops or counters so that the valves occur in spaced relationship above the counters and such that serving glasses and the like can be conveniently positioned on the counters, below the valves, to receive beer issuing from the valves.

The beer is delivered from the kegs to the dispensing valves through elongate beer delivery lines with upstream ends that are connected with taps that are engaged in the kegs. The beer lines extend from the kegs and from within the cold rooms and extend to the dispensing stations where their downstream ends are suitably connected with the dispensing valves.

The beer lines are most often established of ¾"-ID plastic tubing that is especially formulated and approved for handling alcoholic beverages. The beer lines vary in length from about 15' or 20' to in excess of 100'. The downstream ends of the beer delivery lines connect with the upstream ends of equalizer or balance lines made of similar plastic tubing but which is smaller in inside diameter than the beer lines. For example, the balance lines are established of ¼"-ID tubing. The balance lines vary in length between 9' and 15'. Typically, the downstream ends of the balance lines connect with the upstream ends of ¼"-ID stainless steel connector tubes that project from the lower ends of the towers and that extend up through the towers and connect with the valves.

In practice, beer is driven and caused to move from the kegs through the beer lines and to the valves by gas pressure. To this end, suitable high-pressure motive gas supplies are provided to introduce gas under desired pressure, into the kegs. The motive gases most commonly used are air, carbon dioxide, nitrogen, and combinations of those gases. The gases are most commonly provided in compressed gas cylinders that are stored in the cold rooms and are conducted from the cylinders into the kegs, to the taps, through gas lines. Pressure regulators are provided in the gas lines to control the pressure of the gas in the kegs. Due to friction losses in the systems, the pressure at which the gases are introduced into the kegs is adjusted and set so that beer dispensed from the dispensing valves flows at a set desired rate. The usual rate at which beer is dispensed from the dispensing valves is between 2 and 4 ounces per second.

It is important to note that when the gas ($CO_2$) that is entrained in beer is let or caused to separate from the beer, it creates foam composed of gas-filled bubbles of beer. When beer is dispensed into a serving glass, the foam generated by the escape of gas is seen to rise to the top of the beer. The foam is rather stable and is such that it breaks down at such a slow rate that it must often be directed to waste by letting it overflow and/or pouring it off from the glasses in which the beer is to be served. If beer is not properly handled, in excess of 50% of the beer can be lost to waste, in the form of foam. It is to be noted that the gas that is entrained in beer imparts into the beer that tongue and pallet stimulating sensation that consumers of beer desire and that is sometime called its "life." As gas escapes from beer and is carried away in the form of foam, the beer loses its "life" and becomes what is referred to as "flat" and unpalatable, at a rapid rate. Thus, beer in a glass containing a large volume of foam is likely to have lost so much gas that it is flat and of inferior character, if not unmerchantable.

The gas in beer is quite unstable and is such that if let or caused to rapidly expand, as result of rapid thermal heating of the beer or as a result of a rapid reduction of pressure on the beer, it will immediately reach or attain a highly excited state in which adjacent expanding bubbles of beer displace the liquor of the beer and continue to establish ever-increasing larger bubbles of gas that cannot be contained by and that seek to escape or separate from the beer. Once the above gas-separating process starts and/or is put into motion, it does not stop immediately when the temperature and/or pressure on the beer becomes stabilized, but continues until the kinetic energy created by the process is spent and the beer returns to a suitable quiet state.

As the temperature of beer is lowered, the gas entrained therein contracts and becomes more stable and less likely to separate from the beer. Accordingly, it is desirable to chill beer to as low a temperature (above freezing) as possible when it is dispensed.

It is also to be noted that the above-noted gas-release process resulting from rapid rises in temperature and/or rapid drops in pressure will occur at any temperature, though the severity of the process decreases as the temperature of the beer is decreased.

Next, it is to be noted that beer stored in kegs is maintained under pressure to maintain the gas compressed and entrained in the beer. When the pressure on the beer is suddenly released or reduced, as when the dispensing valves are opened, the gas entrained therein is let to expand and the above-noted gas-releasing process is set into motion. When the dispensing valves in beer-dispensing systems of the nature and character referred to above are opened, the pressure on the beer, immediately downstream from the valves, is released and the gas entrained in the beer commences to release. The foregoing results in the beer being driven or blasted through and out of the dispensing valves with and by the gas released immediately downstream thereof. As a result of the foregoing, the prior art has resorted to the provision and use of the above-noted balance lines. The balance lines, which are smaller in inside diameter than the beer delivery lines, function to cause the drop in pressure that occurs when the dispensing valves are open to occur in the downstream end portions of the beer delivery lines. The balance lines are of sufficient length so that as the beer and free gas (that is released in the beer lines) enters the upstream ends thereof and continues to flow therethrough it become sufficiently quite so that the freed gas is reabsorbed by the beer by the time the beer reaches and flows through and from the dispensing valves. While the noted balance lines are effective to eliminate or greatly reduce those adverse effects that result from a rapid release of pressure on beer, they have little or no effect in preventing the adverse effects that result from progressive warming of the beer and expansion of the gas contained therein. As a result of the foregoing, while the provision and use of the above-noted balance lines attains beneficial end results, they are not wholly effective to prevent the escape of gas from beer flowing therethrough and the generating of excess foam that is discharged through and from the dispensing valves with the beer that is dispensed.

It is to be noted that the portions of the beer lines that extend from the cold rooms to the dispensing stations and the balance lines, connecting tubes and valves are exposed to the ambient temperatures of the establishments in which the beer-dispensing systems are installed. Accordingly, though the beer might be cooled to 40° F. when it enters the beer lines, it will (if not maintained cooled) warm and heat to temperatures beyond which the beer can be satisfactorily dispensed. To this end, the prior art has resorted to the provision and use of what the art refers to as "glycol machines or systems" that serve to prevent excess warming of beer as it flows through beer-dispensing systems. The above-referred to glycol systems typically include refrigerated glycol heat exchanger units within the cold rooms and in which a glycol (anti-freeze) solution is chilled. The systems next include an elongate glycol delivery line with an upstream end that connects with the heat exchanger unit and that extends longitudinally of the beer lines in heat-conducting contact therewith; and a glycol return line continuing from the downstream ends of the glycol delivery line and that extends longitudinally of the beer line, in heat-conducting contact therewith and that has a downstream end that connects with the heat exchanger unit. Pump means are included to cause the glycol solution to continuously recirculate through the glycol lines and the heat exchange unit. The related beer lines and glycol lines are contained within an elongate thermal-insulating jacket structure. The assembled beer and glycol lines and the thermal-insulating jacket establish what is commonly referred to as a "trunk line."

In practice, the glycol delivery and return lines are commonly extended to run parallel with and adjacent to the balance lines.

The glycol lines are established of the same plastic tubing as the beer delivery lines and balance lines.

While the above-noted glycol systems would appear to establish good and effective heat exchanger means that would work to further chill or prevent warming of beer flowing through the beer lines and balance lines, in some instances they do not prevent warming of the beer but simply slow the rate at which it warms. This is due to the fact that the plastic tubing of which the several lines are established has an extremely low coefficient of heat conductivity. Further, while the glycol and beer-conducting lines contact each other, that contact seldom amounts to more than thin line contact. Further, due to space limitations and the like, the thermal-insulating jackets used in trunk lines are not so efficient a barrier of heat to prevent some heat from entering the trunk lines and reaching the beer delivery lines. As a result of the foregoing, when, for example, glycol chilled to 25° F. is conducted through 100' of glycol line in a 50' long trunk line and beer, at 40° F., is conducted through a related 50' of beer line within that trunk line, the temperature of the glycol, as it is returned to the glycol heat exchanger, is likely to be warmed to no more than 27° F. and the beer, at the downstream end of the beer line is likely to be warmed to an excess of 40° F. Accordingly, the noted glycol systems often do no more than to notably slow the rate at which beer warms as it flows through related beer lines, they do not necessarily and in all instances chill or prevent warming of the beer. That warming of the beer that often does take place and results in expansion of the gas entrained in that beer to render the gas highly unstable and very likely to commence to separate from the beer.

The above-noted warming of beer as it moves through the noted trunk lines is accelerated somewhat as it advances through related balance lines to dispensing valves. This further unstabilizes the gas in the beer and renders it such that when the dispensing valves are opened, and the pressure on the beer is released, gas commences to escape from the beer, generating foam which is dispensed from the dispensing valves together with that beer which is not foamed.

In the more recent past, the prior art has resorted to the provision and use of high efficiency heat exchangers connected with and between the downstream ends of the beer delivery lines and the upstream ends of related balance lines and through which chilled glycol is conducted to chill and reduce the temperature of the beer from, for example, 40° F. to 30° F. The beer chilled to 30° F. is then conducted into and through the balance lines and thence through and from the dispensing valves. When chilled to 30° F. as noted above, the gas in the beer is considerably more stable than it was when the beer was 40° F. However, if the beer warms two or three degrees as it advances through the balance lines, and the gas expands accordingly, the gas will escape and foam will be generated. The amount of foam that is generated under such circumstances is denser or less in volume and is colder, but it is nonetheless generated and continues to expand.

The most effective and efficient heat exchangers referred to in the foregoing are cold plate type heat exchangers that include cast aluminum bodies with stainless steel beer- and glycol-conducting coils therein that are suitably connected with the beer and balance lines and with the glycol delivery and return lines. The aluminum bodies are suitably jacketed with thermal insulation to block the entry of ambient heat (72° F.)into the bodies.

Other chilling means for lowering the temperature of beer before it is conducted into and through balance lines in beer-dispensing systems have included common refrigerated bath-type chillers. Those heat exchangers have proven to be notably less efficient and effective than the above-noted cold plate type heat exchangers.

In another beer-dispensing system provided by the prior art, the balance lines are established of stainless steel and are arranged within compartments or chambers within related dispensing tower structures mounted atop counters and that carry the dispensing valves. The chilled glycol of related glycol systems is circulated in and through the chamber and about the balance lines to chill the beer within and flowing through the balance lines to the dispensing valves. While this form of heat exchange means is effective to chill beer that is let to stand in the balance lines, the glycol is incapable of carrying off heat from the beer (through the walls of the balance lines) at a sufficient rate to notably chill beer that is continuously flowing through the balance lines at a rate of, for example, 4 ounces per second. As a result of the above, the first-to-be-served beer (that has been let to stand and to chill in the balance lines)is suitably chilled. Thereafter, as the chilled beer is dispensed and new and warm beer enters the balance lines to replace it, the temperature of the beer being dispensed warms at a notable rate and the dispensing of the beer must be delayed after each serving of beer has been dispensed, if beer, at the desired low temperature, is to be served without notable foaming.

In addition to the above, when warm beer enters the balance lines in the last-noted heat exchanger means and combines with previously chilled beer in the balance lines, a portion of the chilled beer is warmed by the incoming beer. When that chilled beer is thus warmed, the gas therein expands and the previously noted gas release process takes place. As a result of the foregoing, when beer is dispensed from systems including the last-noted form of heat exchanger means, the beer dispensed is seldom uniform, that is, it intermittently runs clear and free of foam and then runs laded with foam for short periods of time.

The foregoing led us to recognize the need for heat exchanger means related to the balance lines in beer-dispensing systems that operates to prevent any elevation in temperature of beer and the expansion of gas entrained therein as the beer moves longitudinally downstream through the balance lines; and, a means that preferably operates to effect progressive chilling of the beer as it moves through the balance lines and to thereby cause constriction and increased stabilization of the gas entrained therein.

It was also recognized that a heat exchanger means of the character referred to above should be such that it lowers the temperature of beer flowing through the balance line substantially continuously as it moves therethrough at a rate of at least 40 ounces per minute and such that beer can be substantially continuously intermittently dispensed at a rate of no less than three 10-ounce serving per minute, without the loss of appreciable gas from the beer and the generating of appreciable amounts of foam.

OBJECTS AND FEATURES OF THE INVENTION

It is an object of our invention to provide novel heat exchanger means including an elongate stainless steel beer-conducting balance tube in a beer-dispensing apparatus and an elongate stainless steel glycol tube in heat exchange relationship with the balance tube and through which chilled glycol recirculating through a related glycol cooling system of the beer-dispensing apparatus is circulated to effect progressive cooling of beer that enters and flows downstream through that balance tube.

It is another object of the invention to provide a heat exchanger means of the general character referred to above that is related to and chills that portion of a beverage-dispensing valve that is connected with the downstream end of the balance tube.

Yet another object and a feature of our invention is to provide a novel heat exchanger means of the general character referred to above that includes an elongate, tubular, stainless steel, beer-conducting coil with an upstream end connected with the downstream end of a related beer delivery line and a downstream end that is connected with the upstream end of an elongate stainless steel beer-conducting balance tube that extends to and connects with a beer-dispensing valve, an elongate tubular stainless steel glycol-conducting glycol coil that extends substantially parallel with the beer coil and the balance tube and that has upstream and downstream ends connected with a related glycol chilling and recirculating means; a cast aluminum heat-storing body about the stainless steel coils and tube; and, a thermal-insulating jacket about the body.

It is another object and a feature of our invention to provide a heat exchanger structure of the general character referred to above wherein the glycol coil in the body has an upstream end portion that extends parallel with the balance tube and a downstream end portion that extends parallel with the beer coil so that chilled glycol flowing through the glycol coil first absorbs and carries away heat from beer flowing downstream through the balance tube and last absorbs and carries away heat from the beer flowing downstream through the beer coil and so that the temperature of beer flowing downstream through the beer coil and balance line is progressively lowered.

The foregoing and other objects and features of our invention will be apparent and will be made fully understood in the following detailed description of typical preferred forms and embodiments of our invention throughout which description reference is made to the accompanying drawings.

DESCRIPTION OF THE DRAWINGS

FIG. 7 is an enlarged sectional view of the heat exchanger structure shown in FIG. 5;

DETAILED DESCRIPTION OF THE INVENTION

Figure 1:
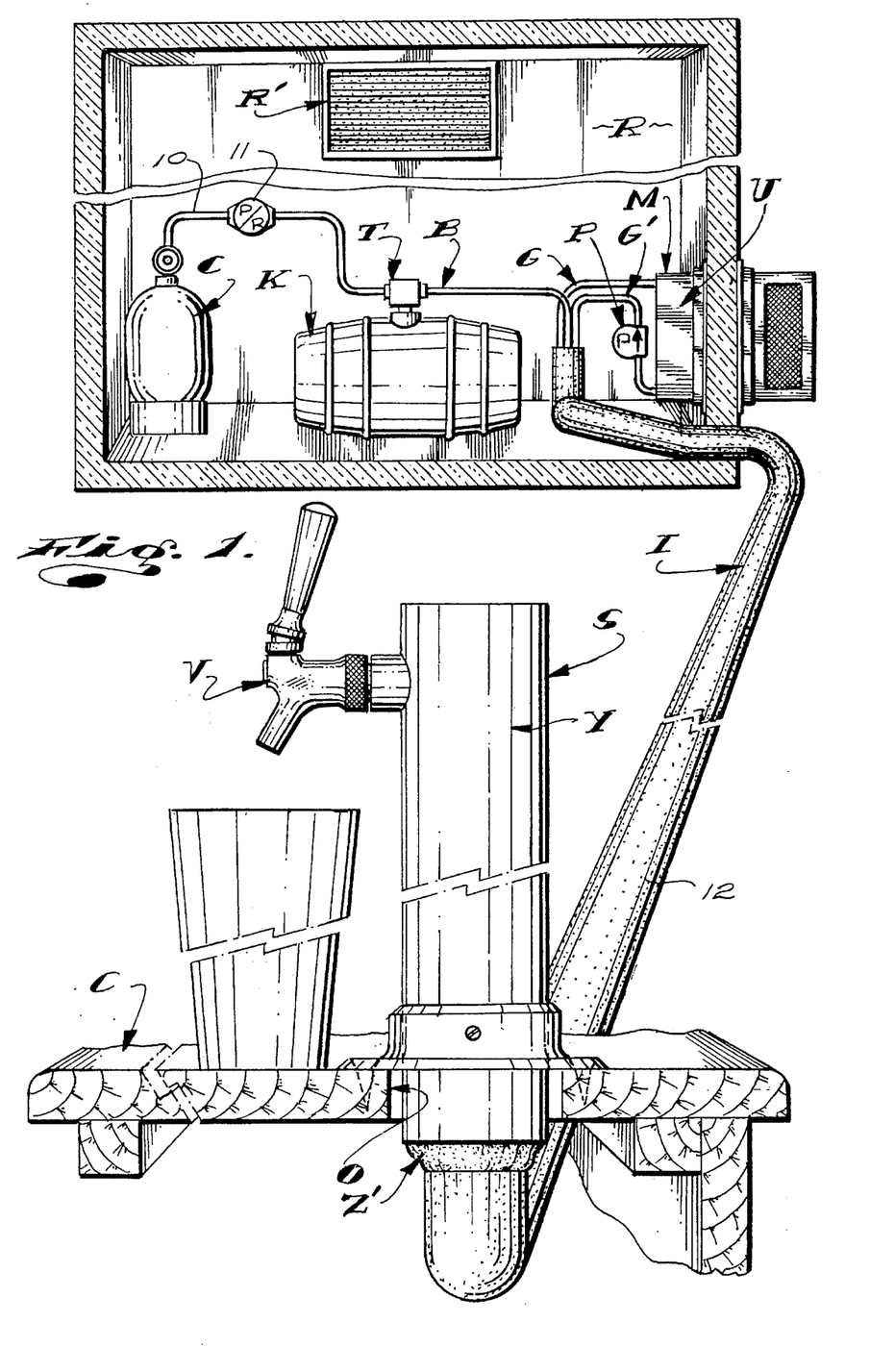
FIG. 1 is a view of a beer-dispensing system and apparatus embodying our invention.

In FIG. 1 of the drawings, we have illustrated one preferred form of beer-dispensing system and apparatus embodying our invention.

The system illustrated first includes a thermally insulated cold room R that is similar in nature and character to those cold rooms that are commonly provided in restaurants, taverns and the like to store foodstuff and beverages that must be kept cool. The cold room R is cooled to a desired low temperature by a refrigeration unit R'. The cold room is normally maintained between a maximum of 45° F. and a minimum of 40° F. For the purpose of this disclosure, the temperature of the cold room R and of that which is stored in it is 40° F.

Within the cold room R is a keg K of beer. The keg contains beer to be dispensed. The keg and the beer contained therein is cooled to 40° F. A common tap T to conduct motive gas into the keg and to conduct beer out of the keg is engaged in the keg.

A cylinder C of compressed gas is positioned in the room and is connected with the tap by a line 10. A pressure regulator 11 is engaged in the line 10 and is set to conduct motive gas from the cylinder into the keg at a predetermined and desired set pressure.

An elongate beer delivery line B is connected with the tap T and extends through a thermally insulated trunk line I that extends from the cold room R to a counter C at a remote beverage serving bar or station, where it is suitably connected with a beer-dispensing valve V.

The system and apparatus illustrated next includes a glycol cooler means M to prevent excess warming of the beer as it flows through the beer line B through the trunk line I to the counter C. The means M can vary widely in form and for the purpose of this disclosure is shown as including a refrigerated glycol heat exchanger unit U within the cold room R and an elongate glycol recirculating means comprising an elongate glycol delivery line G and an elongate glycol return line G' that extend through the trunk line I in heat-conducting engagement with the beer delivery line B. The glycol line G has an upstream end connected with the unit U and the line G' has a downstream end connected with the unit U. A recirculating pump P is shown engaged in the line G.

The means M operates to chill glycol (a liquid anti-freeze heat exchange medium) and to cause it to continuously recirculate through the unit U and the lines G and G'.

In practice, the trunk line I can vary widely in longitudinal extent and for the purpose of this disclosure will be said to be 100' long.

The beer and glycol lines, to meet with well established code requirements, are established of flexible tubing made of specially formulated plastic suitable for safely handling alcoholic beverages. The tubing used has thick walls so that it will not rupture or otherwise fail when the maximum pressures that the lines might be subjected to are encountered. The wall thickness of the lines is also sufficiently heavy and thick so that the lines are not subject to being crimped, pinched or otherwise adversely deformed when worked upon and when in use. The coefficient of heat conductivity of the plastic of which the lines are established is extremely low and is such that little transfer of heat occurs therebetween.

Figures 2, 3, 4:
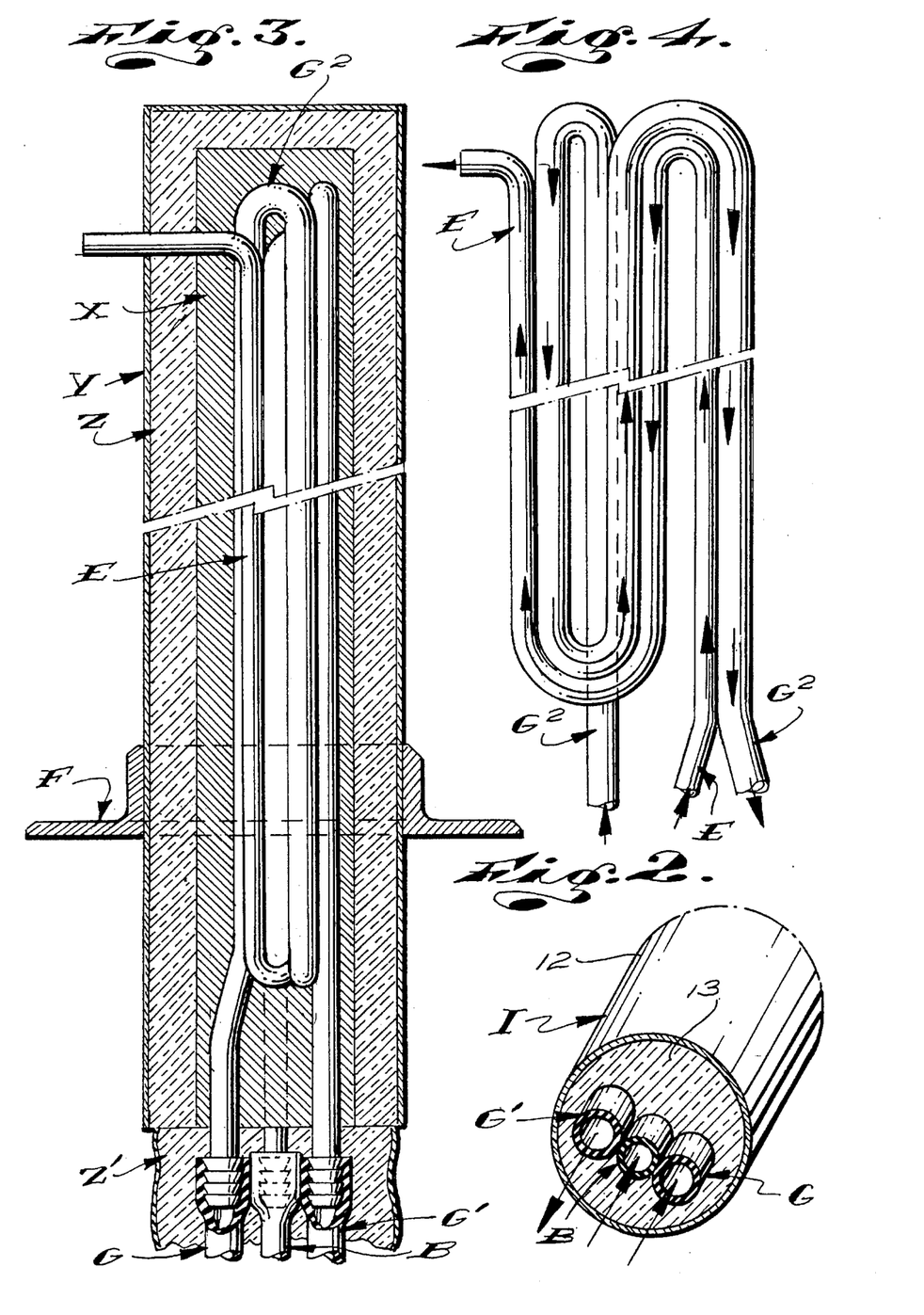
FIG. 2 is a view illustrating the relationship of parts of the trunk line.
FIG. 3 is an enlarged detailed sectional view of the heat exchanger dispensing tower structure.
FIG. 4 is a diagrammatic view showing the flow path of beer and glycol within the tower structure.

The trunk line I, shown in FIGS. 1 and 2 of the drawings, is an elongate flexible line with a durable exterior skin 12 and a core 13 of non-interconnected cellular thermal-insulating foam in which the beer delivery line B and the glycol lines G and G' extend, substantially as shown in FIG. 2 of the drawings.

The trunk line is such that the glycol flowing through the lines G and G' absorbs and carries away much of the ambient heat that enters the trunk line before it reaches the beer line B. Accordingly, the trunk line is effective to noticeably reduce the extent to which the beer is warmed as it moves through the beer line, but it does not eliminate notable heating of the beer.

In practice, the beer line B and glycol lines G and G' can vary in inside diametric extent. For the purpose of this disclosure, the beer line B is a ⅜"-I.D. line and the glycol lines G and G' are ½"-I.D. lines.

In practice, the glycol heat exchange unit U chills the glycol to a temperature below 32° F. For example, the glycol can be chilled to very near the freezing temperature of beer. Due to its alcoholic content, the freezing temperature of most beer is very close to 28° F. Accordingly, it is common practice to chill and maintain the glycol at temperatures between 29° F. and 30° F. This is accomplished by means of a thermostatic control unit (not shown) at the unit U that is responsive to the temperature of the glycol delivered by that unit into the line G.

The portion of the system and apparatus thus far described is old in the art and is illustrative of what one such system and apparatus that can be advantageously used to carry out our invention.

Referring to FIGS. 3 and 4 of the drawings, our invention next includes an elongate equalizer or balance tube E that extends between and is connected with the downstream end of the beer line B and the inlet side of the dispensing valve V. The tube E is a stainless steel tube and is smaller in inside diameter than the beer line. For example, the plastic beer line B is ⅜"-I.D. tubing and the stainless steel equalizing or balance tube E is ¼"-I.D. tubing.

The stainless steel balance tube E is provided in place of the elongate plastic tubing balance lines that are utilized in prior art beer-dispensing systems and apparatus.

In prior art dispensing systems and apparatus, the downstream end of the elongate plastic balance lines connect with the upstream ends of ¼"-I.D. connector tubes that extend vertically through dispensing tower structures to connect with dispensing valves mounted on and carried by the tower structures. In our invention, the balance tube E is an integral part of a new tower structure and eliminates the need for a connecting tube such as is commonly provided in prior art systems and apparatus.

In our invention, the ¼"-I.D. stainless steel balance tube E is a part of a heat exchanger dispensing tower S that is clearly shown in FIGS. 1, 3 and 4 of the drawings. The tube E has an upstream end that is connected with the downstream end of the beer line B and an upstream end that is directly connected with the valve V.

The tower structure S, in addition to the balance tube E, includes an elongate glycol tube $G^2$ of 1/2"-I.D. stainless steel tubing with upstream and downstream ends, accessible at the lower ends of the tower and that connect with the downstream end of the glycol line G and the upstream end of the glycol line G'.

The tower structure next includes an elongate vertical heat sink or heat-storing body X of aluminum that is cast about the tubes E and $G^2$; an outer shell Y of stainless steel or other suitable material that is in spaced relationship about the body X; and, thermal insulation material Z within the shell and about the body. More particularly, the tower is preferably an elongate vertically extending unit that can be of any desired cross-sectional configuration and that has upper and lower ends. In one preferred carrying out of the invention, the tower is slightly greater than 36" in length and the balance tube E, which is about 9' long, is bent into an elongate sinuate coil form with three elongate leg portions that occur within the aluminum body X. The tube E has a lower inlet end portion that depends from the lower end of the body to connect with the beer line B and a laterally outwardly turned outlet end portion that projects outwardly from within the upper end portion of the body X and thence through the insulating material Z and the shell Y to connect with the valve V. The valve V is suitably secured to and carried by the shell, at the exterior thereof.

In practice, the means necessary to connect the tube E with different makes and models of valves V varies widely. Each of those means that are used in the art to connect valves with related beer delivery lines and/or tubes are well known to those who are skilled in the art. Accordingly, we have elected not to burden this disclosure with details of any one of the several valve-connecting means that might be employed.

The glycol tube $G^2$ is formed to extend longitudinally of the tube E in adjacent heat transfer relationship therewith and has lower inlet and outlet end portions that depend from within the body X to connect with the downstream and upstream ends of the glycol lines G and G'.

More particularly and as illustrated in FIG. 4 of the drawings, the flow of glycol through the tube $G^2$ is counter to the flow of beer through the tube E. That is, the glycol first entering the upstream end portion of the tube G works to absorb and carry heat away from the beer flowing downstream through the downstream end portion of the tube E. As the glycol is warmed with heat absorbed from the beer, it advances to and through the downstream end portion of the tube G to absorb and carry away heat from the beer entering and flowing through the upstream end portion of the tube E. As a result of the foregoing, the beer flowing into, through and from the tube E is progressively chilled and at no time is let to warm and to thereby cause the gas entrained in the beer to expand and become unstable.

In addition to the above, progressive cooling of the beer and contracting the beer gas entrained therein, should any gas separate from the beer as a result of a drop in pressure on the beer when the valve V is opened, it is readily and quickly reabsorbed in or by the beer as it advances downstream through the tube E before flowing into and from the valve V.

In practice, for example, if the beer flowing from the beer line B at the downstream end of the trunk line I and into the balance tube E is at 45° F. and the temperature of the glycol entering the glycol tube $G^2$ is at 30° F., the temperature of the beer at the downstream of the tube E and entering the valve V will likely have been chilled below 40° F. More important, the beer issuing from the dispensing valve V will be substantially free of foam caused by the escape of gas from within the beer. The greater part of any foam that might be generated and accumulated at the top of the beer within a glass or the like into which the beer has been dispensed will be foam generated by gas released from the beer within the glass.

In the form of our invention now under consideration, the lower end portion of the tower S is engaged through an opening 0 in the counter C and depends into a space below the counter where its tubes E and $G^2$ are suitably connected with the free end portions of the lines B, G and G' that are accessible at the downstream end of the trunk line I, substantially as shown at the lower end of FIG. 3 of the drawings, In practice, the space or gap that occurs between the downstream end of the trunk line and the bottom of the tower S is wrapped or packed with thermal insulation Z'.

The tower S can be provided with a flanged mounting collar F that is screw fastened or otherwise secured to the top of the counter C and through which the shell of the tower is slidably moved for vertical positioning of the valve V above the counter and that is thereafter set in position by a set screw, as clearly illustrated in FIGS. 1 and 3 of the drawings, It is highly important to note that the transfer of heat between the aluminum body X and the glycol tube $G^2$ is so effective and the heat-storing capacity of the aluminum body X is such that more than enough cold is stored in the body and/or continuously removed by the glycol so that when warm beer is introduced into and flows through the tube E, the ability of the tower to chill beer flowing through it, as noted above, is not adversely diminished; so long as the flow rate of the beer flowing through it does not exceed a maximum predetermined flow rate; such as 4 ounces per second, It is to be noted that if beer is dispensed into glasses at a rate in excess of 4 ounces per second, it is likely to reverse flow and flush itself out of the glasses.

In practice, the tower can be easily made to dispense two or more beers by simply adding the number of balance tubes therein and valves carried thereby.

Figures 5, 6:
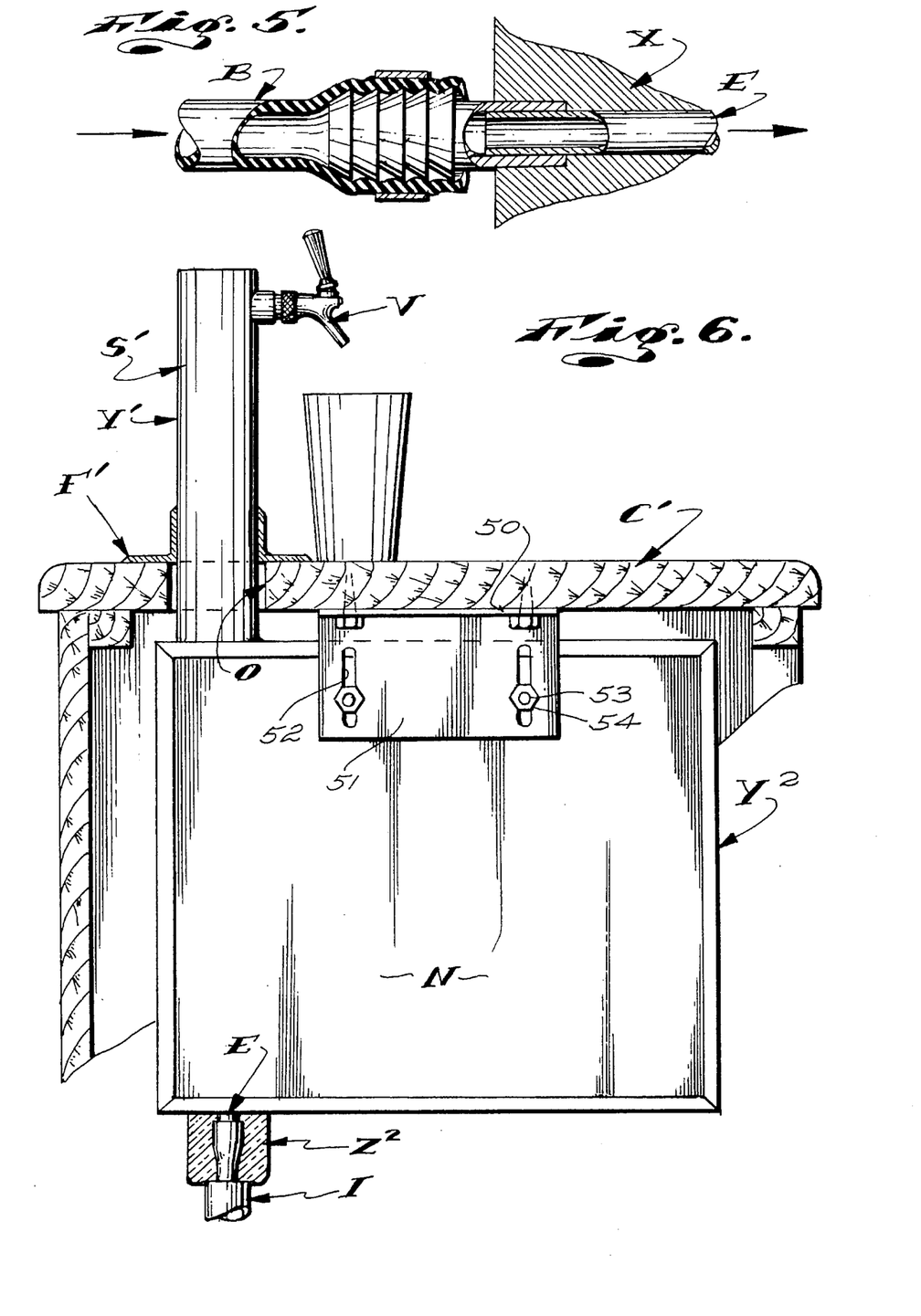
Fig. 5 shows a detail of a hose coupling.
FIG. 6 is a view showing another form of heat exchanger dispensing tower structure embodying our invention.

In FIG. 5 of the drawings, we have shown that form of coupling means that has proven to be highly effective for coupling the beer line B with the balance tube E and for coupling the glycol tube $G^2$ with the glycol lines G and G'.

Figures 2, 8:
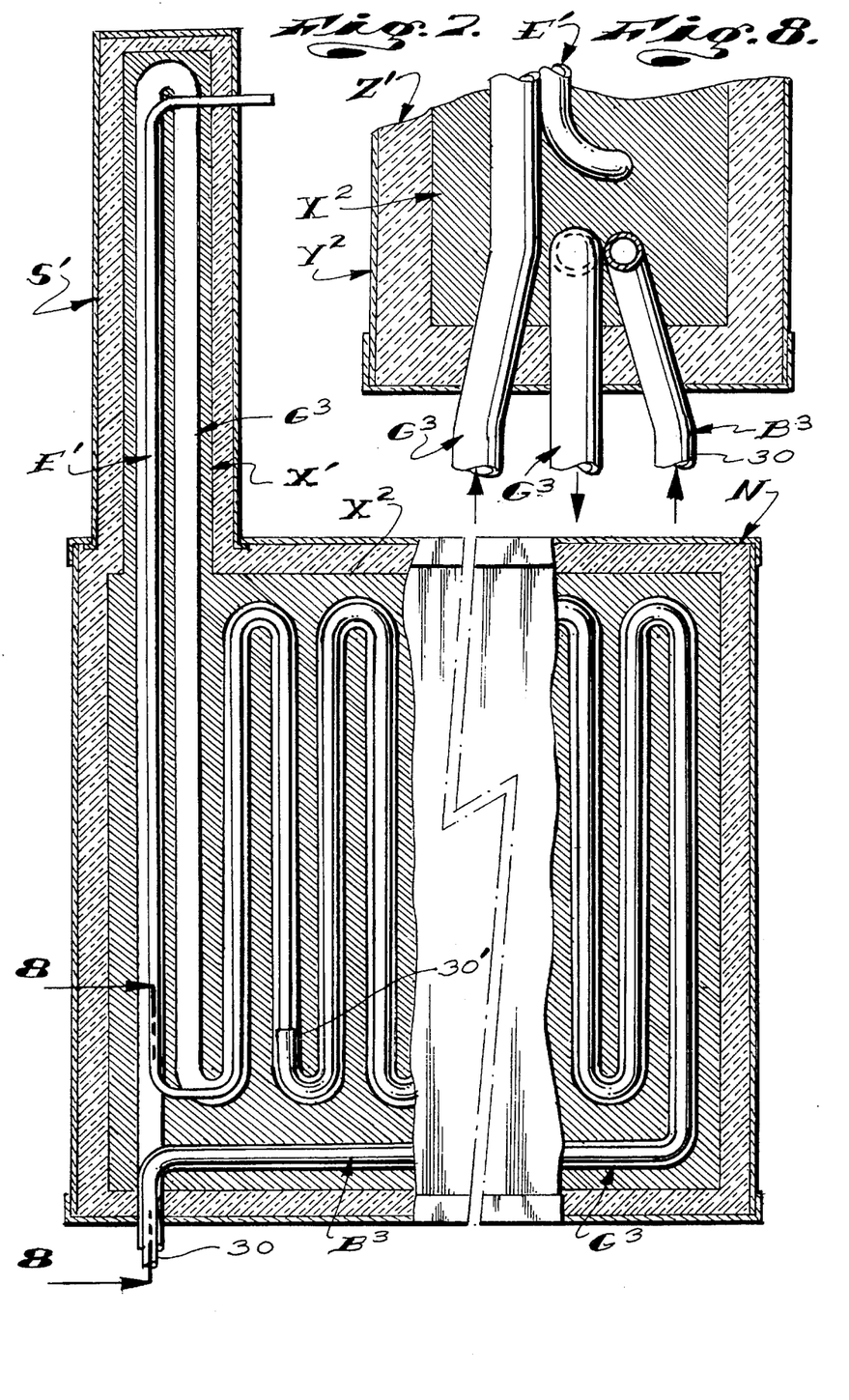
FIG. 8 is an enlarged sectional view taken substantially as indicated by Line 8—8 on FIG. 7.

In FIGS. 6, 7 and 8 of the drawings, we have shown another preferred embodiment of our new heat exchanger beer-dispensing tower S' that includes a primary heat exchanger means N at the lower end portion of the tower and that serves to chill the beer delivered by the beer line B before it enters the balance line E'. In this form of our invention, when the beer delivered by the beer line B to the tower is at 45° F. and the glycol delivered to the tower by the glycol line G is at 40° F., the beer can be chilled to 30° F. and can be continuously dispensed at that low temperature at a rate of 4–12 ounce servings per minute with no appreciable change in temperature and without any foam generated.

The primary heat exchanger means N of this second and preferred embodiment of our invention includes a laterally projecting, vertical wing or plate-like or body $X^2$ of cast aluminum that is formed integrally with the body X' of the tower and in and through which serpentine-formed stainless steel glycol and beer-conducting coils $G^3$ and $E^3$ are arranged in parallel, heat-conducting contact with each other.

The beer coil $B^3$ is a ⅜"-I.D. stainless steel tubular coil that has an inlet or upstream end portion 30 that exits the body to connect with the beer line B and has an outlet or downstream end 30' within the body that is connected with the upstream end of the ¼"-I.D. stainless steel balance tube E' that is within the body.

The glycol coil $G^3$ enters the bottom of the tower and extends upwardly to the upper portion thereof and thence downwardly in parallel heat-conducting transfer engagement with the downstream end portion of the balance tube E'. The upstream end portion of the coil $G^3$ continues to run parallel with the tube E' and thence parallel with the beer coil B' to exit the body and connect with the glycol return line G'.

In this embodiment of our invention, the balance tube E' has a vertically extending downstream leg portion that extends vertically throughout the vertical extent of the tower and has a serpentine-formed upstream portion that extends parallel with a portion of the serpentine-formed glycol coil $G^3$ that is within the flat wing or plate-like body $X^2$ of the means N.

The above-noted relationship of parts makes it easier and therefore more economical to make a tower structure with two or more beer-conducting coils and balance tubes for dispensing two or more beers. In practice, we have produced this second and preferred form of our invention with three beer-conducting coils and balance tubes, with related dispensing valves, for dispensing three different beers.

In the second embodiment of our invention, a stainless steel case $Y^2$ is arranged in spaced relationship about the body X' and thermal-insulating foam material $Z^2$ is deposited in the space between the case and the body X', substantially as illustrated.

It is to be noted that the insulating material that we employ is hard non-interconnected cellular foam that is poured into and let to cure and set in the space that it occupies. The foam insulation $Z^2$ in the case $Y^2$ and within the shell Y' of the tower structure S' is poured at the same time to establish a rather dense, uniform and uninterrupted body of insulation that effectively prevents the condensation and accumulation of moisture within the structure that might otherwise adversely affect its thermal-insulating characteristics and result in premature degradation of the structure, as often occurs when other kinds of insulating materials are used.

In this last embodiment of our invention, the case Y' is shown as having a flat horizontal top wall from which the upper portion of the tower projects freely and as having flat vertical oppositely disposed side walls. As shown in FIG. 6 of the drawings, the lower portion of the tower structure is positioned beneath the counter C' with its above-noted top wall opposing the bottom of the counter. The tower S' projects freely upwardly through an opening O' in the counter. The structure is mounted to hang from the bottom of the counter C' by a pair of spaced brackets 50 that are screw-fastened to the underside of the counter and that have depending flanges 51 that occur adjacent the opposite sidewalls of the case. The flanges 51 have vertically extending slot openings 52 through which threaded studs 53 on the sidewalls of the case project. The studs carry clamping nuts 54 that are tightened to fix the structure in desired vertical position relative to the counter.

A flanged collar F' is engaged about the shell Y' of the tower to engage the top of the counter C' and obscure the annulus between the shell Y' of the tower and the opening O' in the counter C'.

Figure 9:
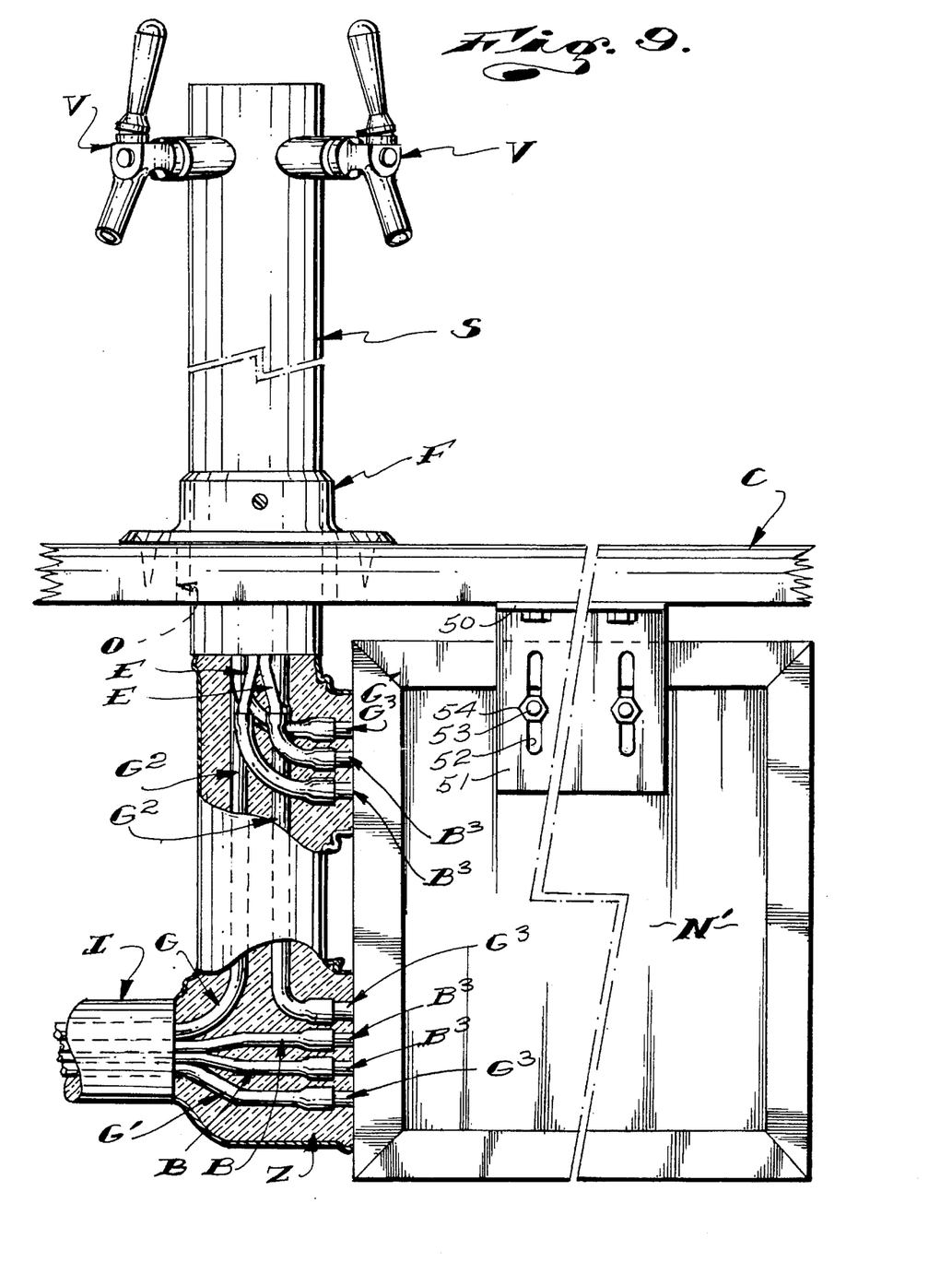
FIG. 9 is a view of another embodiment of the invention.

In practice and as shown in FIG. 9 of the drawings, the heat exchanger dispensing tower S and the primary chilling means N' are separate units. In such a case, the tower is similar to the tower structure shown in FIGS. 1 through 4 of the drawings and the chilling means N' is a simple cold plate unit. That unit includes a case $Y^3$ housing a thermally insulated cast aluminum body in which beer- and glycol-conducting coils are positioned.

In this last embodiment of our invention, the upstream end of the beer coil of the means N' is connected with the downstream end of the beer line B, and the downstream end of the beer coil thereof is connected with the upstream end of the balance tube T in the tower; the upstream end of the glycol tube $G^3$ in the tower is connected with the downstream end of the glycol line G, and the downstream end of the glycol tube of the tower is connected with the upstream end of the glycol coil of the means N; and, the downstream end of the glycol coil of the means N is connected with the upstream end of the glycol line G'. With the foregoing relationship of parts, the chilled glycol is first circulated through the tower S and is used to chill the beer flowing through the balance line E. Thereafter the glycol is circulated through the means N' and is used to chill the beer that flows through the beer coil therein. Accordingly, the beer-conducting tube E of the tower S is downstream from the chilling means N and the glycol-conducting tube $G^2$ of the tower S is upstream of the chilling means N. (The primary beer chilling means N is not simply connected in series with and between the tower structure S and the beer and glycol lines at the downstream end of the trunk line I.)

Having described only typical preferred forms and embodiments of our invention, we do not wish to be limited to the specific details herein set forth but wish to reserve to ourselves any modifications and/or variations that might appear to those skilled in the art and that fall within the scope of the following claims.

Having described our invention, we claim:

1. A beer-dispensing apparatus including a source of pressurized, gas-ladened cooled beer, a beer-dispensing station remote from the source of beer, an elongate beer delivery line with an upstream end connected with the source of beer and a downstream end at the beer-dispensing station, a refrigerated glycol chilling unit, elongate glycol delivery and return lines with upstream and downstream ends connected with the chilling unit, pump means continuously moving glycol through the chilling unit and the glycol delivery and return lines, a heat exchanger beer-dispensing tower at the beer-dispensing station and including an elongate stainless steel beer-conducting balance tube that is smaller in inside diameter than the beer line and has an upstream end connected with the downstream end of the beer line, a normally closed selectively operable beer-dispensing valve connected with a downstream end of the balance tube, an elongate stainless steel glycol-conducting tube with a portion extending longitudinally of and in heat-conducting relationship with the balance tube and having an upstream end connected with a downstream end of the glycol delivery line and a downstream end connected with an upstream end of the glycol return line, chilled glycol flowing through the glycol tube chills beer as it flows downstream through the balance line to the valve.

2. The beer-dispensing apparatus set forth in claim 1 wherein the direction of flow of chilled glycol in the portion of the glycol tube extending longitudinally of the balance tube is counter to the direction of flow of beer in the balance tube.

3. The beer-dispensing apparatus set forth in claim 1 wherein the balance and glycol tubes are within a heat-storing aluminum body.

4. The beer-dispensing apparatus set forth in claim 1 wherein the balance and glycol tubes are within a thermally insulated heat-storing aluminum body.

5. The beer-dispensing apparatus set forth in claim 1 wherein the direction of flow of chilled glycol in the portion of the glycol tube extending longitudinally of the balance tube is counter to the direction of flow of beer in the balance tube; the balance and glycol tubes are within a heat-storing aluminum body.

6. The beer-dispensing apparatus set forth in claim 1 wherein the direction of flow of chilled glycol in the portion of the glycol tube extending longitudinally of the balance tube is counter to the direction of flow of beer in the balance tube; the balance and glycol tubes are within a thermally insulated heat-storing aluminum body.

7. The beer-dispensing apparatus set forth in claim 1 wherein pressure on beer in the balance line drops when the valve is opened and beer is caused to flow through the balance tube and the temperature of the beer flowing longitudinally through the balance tube is lowered so that the drop in temperature of the beer prevents expansion and release of entrained gas in the beer resulting from the drop in pressure thereon.

8. The beer-dispensing apparatus set forth in claim 1 wherein the beer line and the glycol delivery and return lines extend longitudinally through an elongate thermally insulated trunk line that extends from the source of beer to the beer-dispensing station.

9. A beer-dispensing apparatus including a source of pressurized, gas-ladened cooled beer, a beer-dispensing station remote from the source of beer, an elongate beer delivery line with an upstream end connected with the source of beer and a downstream end at the beer-dispensing station, a refrigerated glycol chilling unit, elongate glycol delivery and return lines connected with the chilling unit, pump means continuously moving glycol through the chilling unit and the glycol delivery and return lines; a heat exchanger beer-dispensing structure at the beer-dispensing station and including an elongate stainless steel beer-conducting beer coil with an upstream end connected with the downstream end of the beer line, and elongate stainless steel beer-conducting balance tube smaller in inside diameter than the beer coil and having an upstream end connected with a downstream end of the beer coil and a downstream end connected with a normally closed beer-dispensing valve that is selectively operable to open and dispense beer, an elongate glycol coil with an upstream end connected with a downstream end of the glycol delivery line and a downstream end connected with an upstream end of the glycol return line, the glycol coil extends longitudinally of and in heat transfer relationship with the balance tube and beer coil.

10. The beer-dispensing apparatus set forth in claim 9 wherein the glycol coil has an upstream portion that extends longitudinally of the balance tube from the downstream to the upstream end thereof and a downstream end portion that extends longitudinally from the downstream end to the upstream end of the beer coil.

11. The beer-dispensing apparatus set forth in claim 9 wherein the beer tube, beer coil and glycol coil are within a heat-storing aluminum body.

12. The beer-dispensing apparatus set forth in claim 9 wherein the beer tube, beer coil and glycol coil are within a thermally insulated heat-storing aluminum body.

13. The beer-dispensing apparatus set forth in claim 9 wherein the glycol coil has an upstream portion that extends longitudinally of the balance tube from the downstream to the upstream end thereof and a downstream end portion that extends longitudinally from the downstream end to the upstream end of the beer coil, said balance tube, beer coil and glycol coil are within a thermally insulated heat-storing aluminum body.

14. The beer-dispensing apparatus set forth in claim 9 wherein the balance tube and a section of the glycol coil that extends longitudinally thereof extend through an elongate vertically extending dispensing valve supporting first heat-storing aluminum body section and wherein the beer coil and a section of the glycol coil that extends longitudinally thereof extend through a second heat-storing aluminum body section that is adjacent a lower end of the first body section.

15. The beer-dispensing apparatus set forth in claim 9 wherein the balance tube and a section of the glycol coil that extends longitudinally thereof extend through an elongate vertically extending dispensing valve supporting first heat-storing aluminum body section and wherein the beer coil and a section of the glycol coil that extends longitudinally thereof extend through a second heat-storing aluminum body section that is adjacent a lower end of the first body section; the first and second body sections are within thermal-insulating jacket structures.

16. The beer-dispensing apparatus set forth in claim 9 wherein the balance tube and a section of the glycol coil that extends longitudinally thereof extend through an elongate vertically extending dispensing valve supporting first heat-storing aluminum body section and wherein the beer coil and a section of the glycol coil that extends longitudinally thereof extend through a second heat-storing aluminum body section that is adjacent a lower end of the first body section; said first and second body sections are integrally joined with each other.

17. The beer-dispensing apparatus set forth in claim 9 wherein the balance tube and a section of the glycol coil that extends longitudinally thereof extend through an elongate vertically extending dispensing valve supporting first heat-storing aluminum body section and wherein the beer coil and a section of the glycol coil that extends longitudinally thereof extend through a second heat-storing aluminum body section that is adjacent a lower end of the first body section; said first and second body sections are integrally joined with each other; the first and second body sections are within a thermal-insulating jacket structure.

18. The beer-dispensing apparatus set forth in claim 9 wherein the beer line and the glycol delivery and return lines extend longitudinally through an elongate thermally insulated trunk line that extends from the source of beer to the beer-dispensing station.

\* \* \* \* \*